United States Patent
Tan et al.

(10) Patent No.: US 6,563,948 B2
(45) Date of Patent: May 13, 2003

(54) USING AN ELECTRONIC CAMERA TO BUILD A FILE CONTAINING TEXT

(75) Inventors: Yap-Peng Tan, Chandler, AZ (US); Tinku Acharya, Tempe, AZ (US); Werner Metz, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/301,753

(22) Filed: Apr. 29, 1999

(65) Prior Publication Data
US 2002/0057848 A1 May 16, 2002

(51) Int. Cl.[7] .................................................. G06K 9/00
(52) U.S. Cl. ........................ 382/187; 382/105; 382/178; 382/187; 382/321; 340/937
(58) Field of Search .................................. 382/178, 298, 382/312–313, 321, 105, 204, 291; 340/937

(56) References Cited

U.S. PATENT DOCUMENTS

| | | | | |
|---|---|---|---|---|
| 4,817,166 A | * | 3/1989 | Gonzalez et al. | 382/105 |
| 5,038,392 A | * | 8/1991 | Morris et al. | 382/175 |
| 5,887,086 A | * | 3/1999 | Tokano | 382/312 |
| 6,028,956 A | * | 2/2000 | Shustorovich | 382/156 |
| 6,081,206 A | * | 6/2000 | Kielland | 340/937 |
| 6,154,576 A | * | 11/2000 | Anderson et al. | 382/269 |
| 6,304,313 B1 | * | 10/2001 | Honma | 355/18 |
| 6,363,381 B1 | * | 3/2002 | Lee et al. | 707/6 |
| 6,385,350 B1 | * | 5/2002 | Nicholson et al. | 382/309 |

FOREIGN PATENT DOCUMENTS

| | | |
|---|---|---|
| EP | 0678822 | 10/1995 |
| JP | 04218887 | 10/1992 |
| JP | 09289624 | 4/1997 |
| NL | 9200329 | 9/1993 |

OTHER PUBLICATIONS

Creating High Resolution Images, Poulo, Richard J., Nguyen, Vu X., Bostrom, Vareck S. & Gorman, Walter L. in *Application for U.S. Letters Patent, Ser. No. 120.257* filed by Trop, Pruner, Hu & Miles, P.C., Houston, TX Jul. 21, 1998.

* cited by examiner

Primary Examiner—Jayanti K. Patel
Assistant Examiner—Gregory Desire
(74) Attorney, Agent, or Firm—Blakely, Sokoloff, Taylor & Zafman LLP

(57) ABSTRACT

An embodiment of the invention is directed to a method of building an electronic file, using an electronic camera such as a digital camera, that captures 3-dimensional objects. A number of image data tiles that represent the images are generated by the camera. A number of text data tiles each containing text recognized in a corresponding one of the image data tiles is generated. The method includes searching for overlapping text in the text tiles, and pasting the text tiles in proper alignment into an electronic file.

27 Claims, 4 Drawing Sheets

USING AN ELECTRONIC CAMERA TO BUILD A FILE CONTAINING TEXT

FIELD OF THE INVENTION

This invention is generally directed to electronic cameras and more particularly to capturing and building a text file using an electronic camera.

BACKGROUND

Electronic cameras such as digital cameras and video cameras are popular consumer products. The electronic camera has special optics and an electronic imager circuit that work together to capture 3-dimensional scenes in electronic form and are used in the same way as conventional chemical film cameras. Another area of conventional electronic imaging is dominated by the scanner which is specifically tailored for scanning a document into a graphics file using image stitching techniques. The graphics file can be fed to an optical character recognition engine (OCR) which recognizes text in the file and then creates a file that contains text strings. This allows paper documents to be converted into electronic files for easier manipulation using a computer. Scanners, however, cannot take pictures of 3-dimensional objects as can be done using the conventional electronic camera. The conventional electronic camera, while constantly being improved to provide higher quality images that rival chemical film cameras, cannot "scan" text into a file. Thus, the technology user who wishes to take electronic pictures of friends and family and also wishes to scan text is forced to purchase both the scanner and the camera.

SUMMARY

An embodiment of the invention is directed to a method of building an electronic file, featuring the steps of forming a number of light images of portions of a scene on a camera imager, the imager being a part of an electronic camera that captures 3-dimensional objects, and generating a number of image data tiles that represent the images using the camera. A number of text data tiles each containing text recognized in a corresponding one of the image data tiles is generated. The method includes searching for overlapping text in the text tiles, and aligning the text tiles.

Other features and advantages of the invention will be apparent from the accompanying drawings and from the detailed description that follows below.

BRIEF DESCRIPTION OF THE DRAWINGS

The invention is illustrated by way of example and not by way of limitation in the figures of the accompanying drawings in which like references indicate similar elements and in which.

DETAILED DESCRIPTION

An embodiment of the invention is directed to an apparatus and method for building an electronic file using an electronic camera. Such an electronic camera thus plays a dual role, as both a conventional camera as well as a scanner, thereby reducing the cost of taking conventional pictures of distant objects and scanning text. Configuring an electronic camera to scan text according to the techniques described below permits the creation of an electronic file such as a plain text file or a composite text/graphics word processor file that depicts text on a 3-dimensional object, such as a packing container, or on distant objects with unusually large text, such as black boards and white boards. Scanning text from such objects would present a problem for the conventional handheld scanner. A further advantage provided by an embodiment of the invention is that no image stitching techniques are needed to form the text file. Image stitching techniques that operate upon rastergraphics data require a significant amount of data processing and storage resources. In contrast, the text linking techniques used in the invention search for and align text strings (letters and words) which have much fewer degrees of freedom than rastergraphics data and are therefore much less compute-intensive to manipulate. This makes text linking more suitable for use in a limited resource environment such as the electronic camera.

Figure 1:
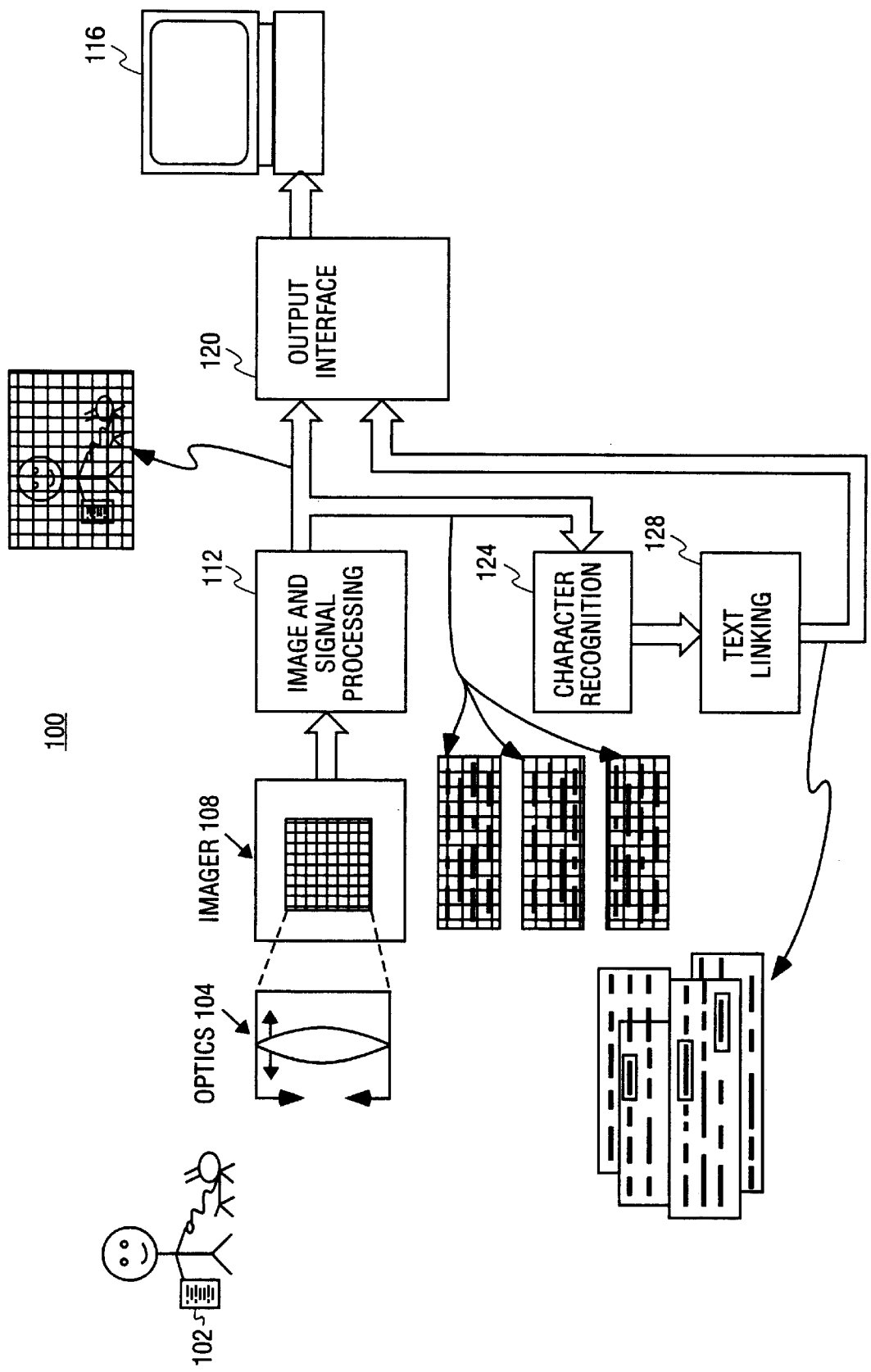
FIG. 1 shows a block diagram of an electronic camera configured according to an embodiment of the invention.

FIG. 1 illustrates an electronic camera 100 configured according to an embodiment of the invention. The camera 100 includes conventional optics 104 having an optical path that leads to an imager 108 positioned at the focal plane of the optics. The optics 104 may feature a zoom lens and an adjustable aperture. Such a combination allows the camera 100 to capture scenes under a wide range of field of view/depth of field, covering both close-ups of documents as well as distance shots of 3-dimensional scenes that cannot be captured with conventional scanners. The optics 104 and the imager 108 together are capable of a field of view/depth of field that cannot be achieved with conventional scanners. This allows the capture of 3-dimensional scenes containing large solid objects and distant objects, whereas scanners are only capable of capturing printed matter that is 2-dimensional and is positioned relatively close to the scanner. The optics 104 may also support a variable field of view/depth of field by, for instance, incorporating a zoom lens.

The imager 108 may be implemented according to a wide range of conventional techniques, using technologies such as charge coupled device(CCD) or complimentary metal oxide semiconductor (CMOS). The digitized raw image data generated by the imager 104 is processed by conventional digital image and signal processing circuitry 112 to yield digital image tiles (e.g. pixel arrays) of the captured scene. These tiles may have the full spatial resolution of the imager sensor array, or they may be scaled or cropped portions thereof. The tiles may represent portions of a document 102, and are normally obtained by moving the camera 100 around the document 102 while the camera captures a series of overlapping tiles to cover the entire document.

The tiles may be transferred to an external data processing device 116 that is not exclusively a stand alone camera, such as a personal computer (PC), in digital image file format. An interface 120 in the camera 100 may be to a conventional computer peripheral bus that connects the camera to the PC or to a PC peripheral. Software in the PC can then render or further process the digital files to display them as still images or as motion video. The PC may also be configured with additional software to perform the text recognition and text linking steps according to certain embodiments of the invention. The interface 120 may also be used to transfer an electronic file containing the linked text to the PC.

To generate the linked text file, the camera 104 has a character recognition engine 124 that works with a text linker 128. The character recognition engine 124 may be based on a conventional optical recognition engine (OCR) that recognizes printed text in a graphics image file and in response outputs the recognized text in a format readily useable by a computer. The character recognition engine 124 provides a text data tile that contains strings of recognized text appearing in a corresponding one of the image tiles. These text tiles are collected and linked together by the text linker 128 thus building a "linked text file."

The text linker 128 looks for a matching text string in two different text tiles, and pastes the text tiles in proper alignment into the text file. To maximize the likelihood of proper alignment, the matching string should be relatively long and should also occur infrequently in a text tile. This linking process repeats with successive text tiles to build up the stitched text file that eventually represents the document 102. Both the text linker and the character recognition engine may be implemented as a processor executing instructions from a memory, either in the camera 100 or in the digital processing device 116.

Figure 2:
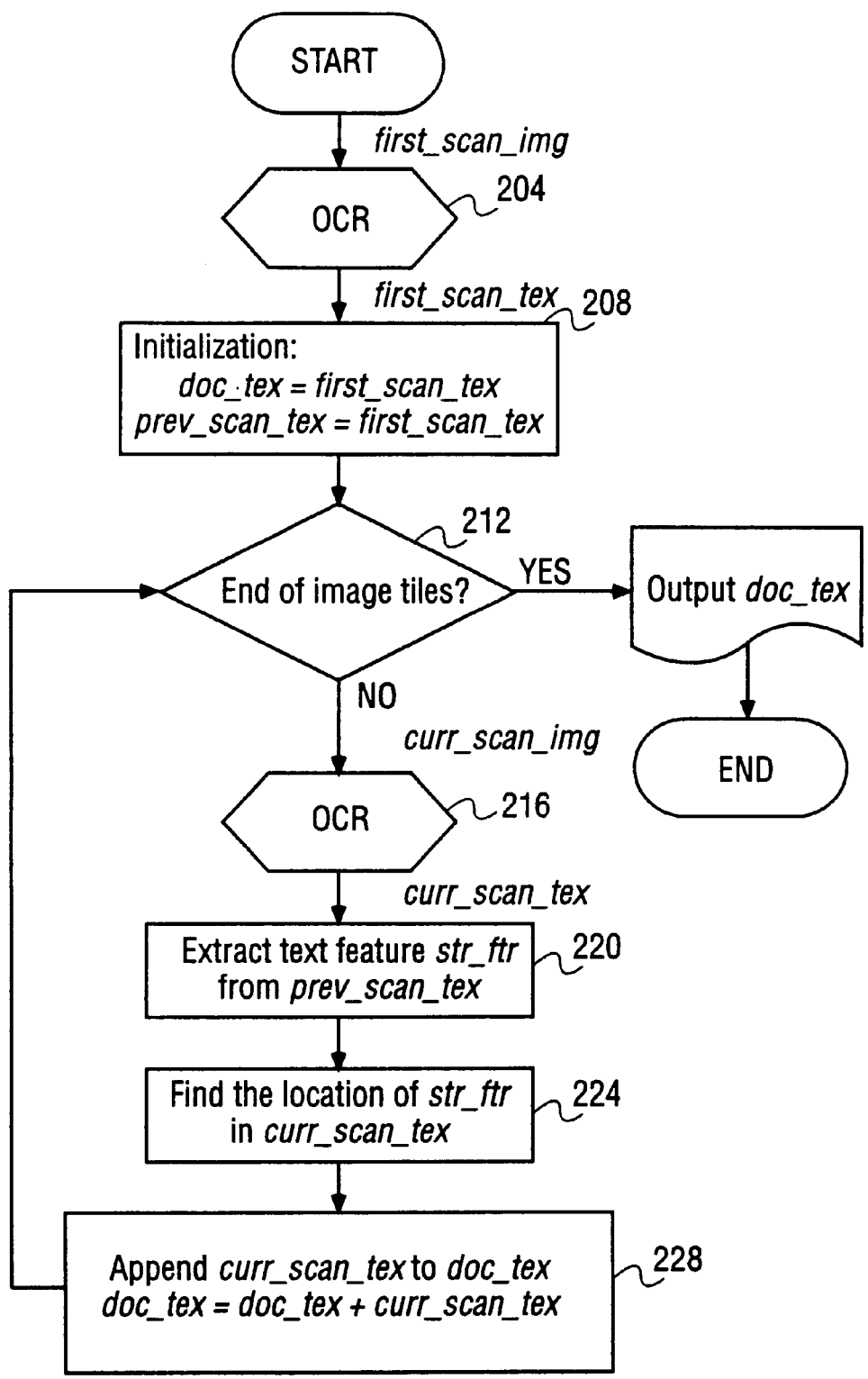
FIG. 2 illustrates a flow chart of operations performed according to an embodiment of the invention.
Figure 3:
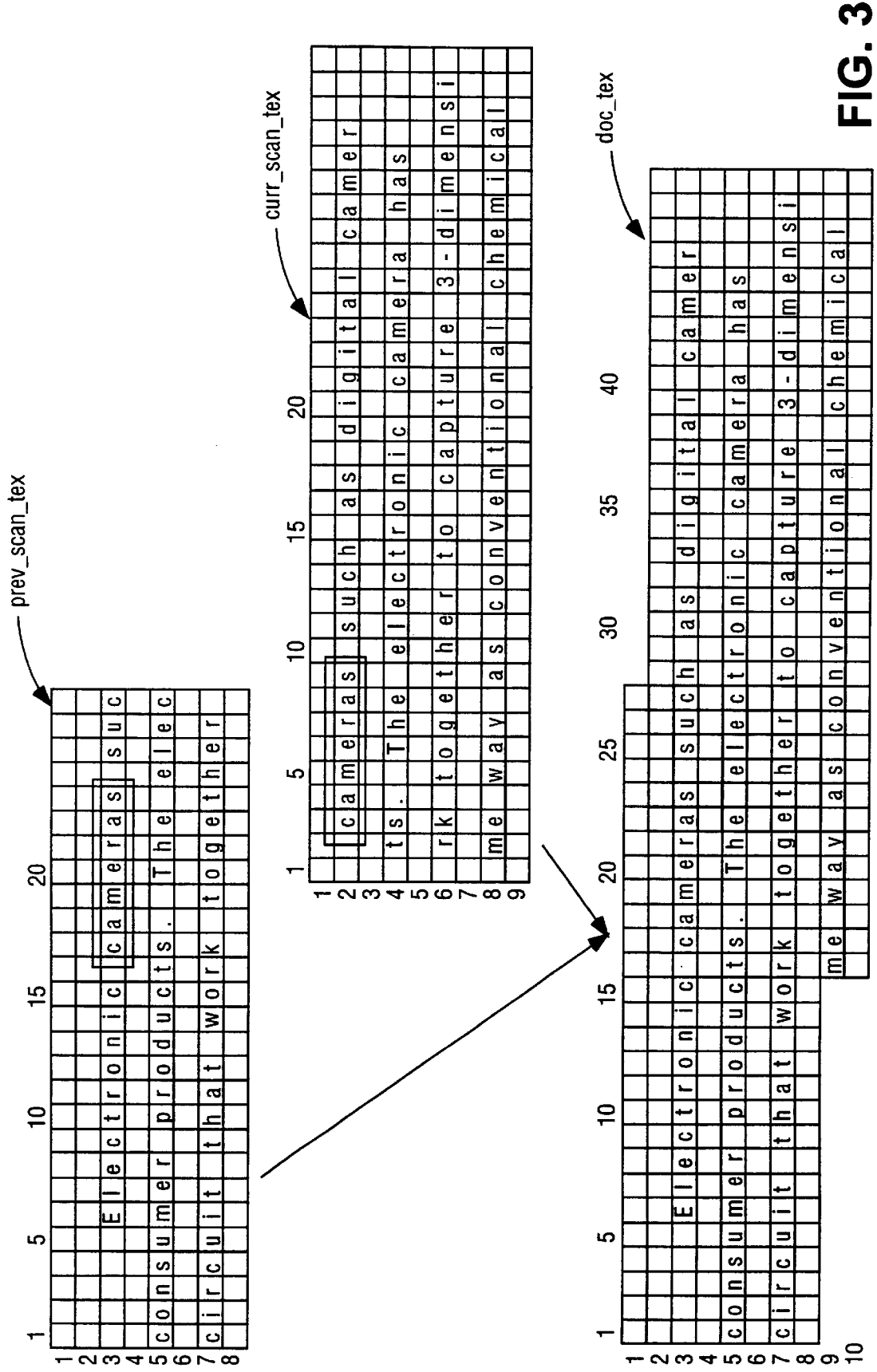
FIG. 3 shows how two text tiles are aligned.

FIG. 2 shows a text recognition and linking procedure according to an embodiment of the invention, and FIG. 3 shows two exemplary text tiles being linked. Operation begins with a first digital image tile, first_scan_img, being fed to an OCR in step 204 to yield a first text tile, first_scan_tex. Each of these tiles may be represented by a two-dimensional array of strings, where each element of the array may be a phrase, letters, or even a single character. Normally, the OCR will be configured to focus only on the text in "high confidence regions" of an image tile to reduce the possibility of recognition errors. The OCR may provide a confidence index value that gives an indication of the OCR's level of confidence in recognizing a particular text string in the image tile. It may be that a full resolution image obtained by a digital camera exhibits geometric distortion in the corners and edges. Thus, a tile having the full resolution of a camera may be cropped prior to being fed to the OCR to maximize the high confidence region and the confidence index. Operation then continues with step 208.

In step 208, the electronic file doc_tex is initialized with the first text tile. The text file doc_tex may initially be represented by a sufficiently large two-dimensional array of strings. When all of the desired image tiles have been processed and the linking is complete, the array may then be converted into any one of a number of known word processor formats. An array corresponding to prev_scan_tex is initialized in step 208 to the first_scan_tex. Operation then continues with a loop beginning with step 212. While there are still image tiles to process, a current text tile, curr_scan_text, is obtained from the OCR in step 216, and a feature to be matched, str_ftr, is extracted therefrom in step 220. To maximize the likelihood of aligning the text in the prev_scan_tex with that in the curr_scan_tex, the str_ftr should include a relatively long word or sequence of characters. If a long word is not available in the prev_scan_tex, then a series of sequentially occurring words should be selected as the str_ftr. Alternatively or in addition, the linker may be configured to ignore certain "stop-words" such as "the", "of", "an", and "and", such that the selected str_ftr should not contain any such stop-words. Once the str_ftr has been extracted, operation proceeds with step 224.

In step 224, the linker searches the curr_scan_tex and prev_scan_tex for the str_ftr. If str_ftr is found in both of the tiles, the curr_scan_tex is appended to doc_tex in step 228 if properly aligned with prev_scan_tex. The alignment and appending steps are depicted by an example in FIG. 3. The word "cameras" (starting at $2^{nd}$ row and $3^{rd}$ column of curr_scan_tex) is selected as the str_ftr and its corresponding location in prev_scan_tex is at $3^{rd}$ row and $17^{th}$ column. The validity of this corresponding location, i.e. the alignment, can be further confirmed by its neighboring text strings, such as "suc", "ts. The", "elec", etc. These two text tiles can be linked into one by appending curr_scan to prev_scan according to their location difference, which is (3–2 row, 17–3 column)=(1 row, 14 column). To be more specific, the linking of these two tiles can be formulated as:

$$\text{prev\_scan}(i+1, j+14) = \text{curr\_scan}(i,j) \text{ for all } (i,j)$$

The result of this text linking step is shown in FIG. 3 as doc_tex. Operation then loops back to step 212. When all of the image tiles have been processed in this way, the linker 128 produces the doc_tex in step 232, either as a conventional ASCII file or as a pointer to a string array. If the camera 100 is also connected to a computer, then the linked text file can be displayed simultaneously while it is being built.

Figure 4:
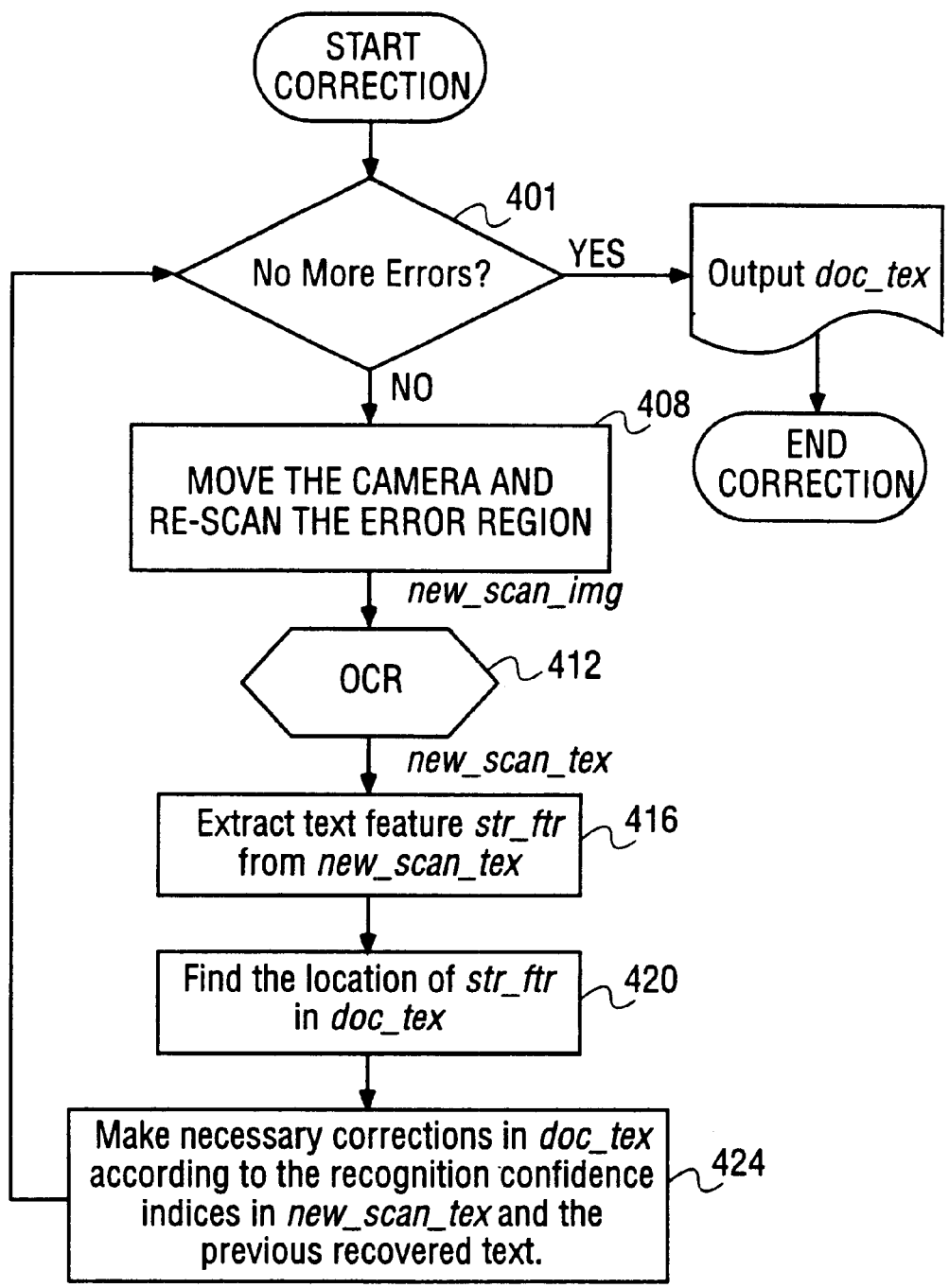
FIG. 4 depicts a flow chart of correction operations.

An additional feature of the invention is shown in FIG. 4 as a technique for correcting errors in the linked text file. Such errors may include improperly recognized text or misalignments of text tiles. These errors may be detected by a user while watching the linked text file being built and comparing it to the actual document being scanned. Alternatively or in addition, the errors may be detected using an automated methodology such as a spelling checker built into the camera and that can detect misspelled words or sequences of words in the linked text file. In another alternative, the OCR confidence index may indicate a recognition error which may be immediately signaled to the user using an audio-visual alert such as a warning beep. Once an error has been detected, the normal recognition and linking procedure can be interrupted to invoke a correction routine upon encountering the error. This may be more efficient than waiting for the entire document to be processed before reviewing the resulting linked text file for errors. In general, the correction technique of FIG. 4 may be applied at any time during or after the procedure of FIG. 2.

Operation begins with step 404 in which the correction routine determines whether there are no more errors to be corrected. If there are any, then operation continues in step 408 in which the routine waits for the camera to be positioned over a region of the scene that contains text corresponding to the error. Operation then continues with step 412 in which a new image tile, new_scan_img, of the region is obtained by the camera and fed to the OCR. The OCR proceeds with text recognition and generates a new text tile, new_scan_tex, based on the new_scan_img. Assuming that the new_scan_tex contains no recognition errors, a string feature str_ftr is then extracted from the new_scan_tex in step 416. Once again, the str_ftr should be as unique as possible and should have a high recognition confidence index as given by the OCR, such that the string can be quickly found while searching the previously created doc_tex around the region where the error occurred, as in step 420. When the str_ftr is found in both the doc_tex and the new_scan_tex, as in step 424, the alignment of the tiles is verified and, if aligned, the new_scan_tex is pasted over the previously recovered text which contained the error in the doc_tex. This correction can be further verified by displaying the new_scan_tex correction on a monitor being viewed by the user. Operation then loops back to step 404 to correct any additional errors.

If the user, while viewing a display monitor showing the doc_tex, sees that the error has not been corrected, then she may make another attempt to correct the error, but this time either changing the camera focus by adjusting the optics 104 or changing the distance between the camera and the object being scanned. This may let the camera obtain a sharper image of the error region to reduce the likelihood of another recognition error. Alternatively, an image that covers a larger region and that allows a more reliable alignment step may be obtained. As an enhancement to the embodiments described above, the system may be configured to warn the user that the text tiles being received from the camera imager are not sufficiently clear and are likely to result in text recognition errors, or that they do not contain sufficient overlap to yield a reliable alignment. This may be done by, for instance, sending a warning to a camera display window or to a window of the external data processing device 116 (see FIG. 1).

In one embodiment of the invention, also referring to FIG. 1, a conventional image stitching routine may be loaded into the separate data processing device 116 to allow the scanning of graphical figures in addition to the text linking described above. If the OCR does not recognize any text in some of the image tiles, then these tiles may be fed to the image stitching routine (not shown) rather than the text linker 128 to generate a graphics figure. The user may then be signaled an option as to whether this graphics figure should also be appended to the electronic file. Of course, the user may later replace the stitched graphics figure with a higher quality original if desired.

To summarize, various embodiments of the invention have been described that are directed to a method of using a solid state camera to build a file containing text. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather that a restrictive sense.

What is claimed is:

1. An electronic camera comprising:
   optics having a depth of field greater than a conventional scanner to form a plurality of light images of an object that displays text;
   camera imager to receive the light images and in response provide a plurality of image data tiles, respectively, that capture different portions of said text;
   optical character recognition engine to provide a plurality of text data tiles each containing a portion of said text recognized from a corresponding one of the plurality of image data tiles; and
   text linker to search for a portion of said text that overlaps in the plurality of text tiles; and
   means for correcting error text in the plurality of image data tiles, which includes means for re-capturing a region of the scene that contains correct text corresponding to the error text and means for replacing the error text with the correct text.

2. The camera of claim 1 wherein the optics is adjustable to provide variable depth of field.

3. The camera of claim 1 wherein the text linker appends the text data tiles in proper alignment to an electronic file.

4. The camera of claim 3 further comprising
   image stitching engine for generating a graphics figure in response to stitching some of the plurality of image data tiles that contain portions unrecognized by the optical character recognition engine; and wherein the linker is further configured to append the graphics figure to the electronic file.

5. The camera of claim 1 wherein the image tiles are of different spatial resolutions.

6. The camera of claim 1 wherein each image tile has the full spatial resolution of the camera imager.

7. The camera of claim 1 wherein the character recognition engine and the text linker are implemented as a processor executing instructions.

8. The camera of claim 1 further comprising
   an output interface to a data processing device which is not exclusively a stand alone camera, for transferring the electronic file to the device.

9. The camera of claim 8 wherein the output interface complies with a computer peripheral bus specification.

10. An article of manufacture comprising:
    a machine-readable medium having instructions that, when executed by a processor cause a system to:
       receive a plurality of image data tiles that represent a plurality of light images of different portions of a scene captured by an electronic camera having optics with a depth of field greater than that of a conventional scanner;
       generate a plurality of text data tiles each containing text recognized in a corresponding one of the image data tiles;
       search for overlapping text in the text tiles, append the text tiles in proper alignment to an electronic file, and correct an error in the electronic file by recognizing correct text in another image tile, that represents a portion of the scene previously captured by the camera, and replacing the error with the correct text.

11. An article according to claim 1 further comprising instructions that when executed cause the system to:
    generate a graphics figure in response to stitching some of the plurality of image data tiles and append the graphics figure to the electronic file.

12. A method comprising:
    forming a plurality of light images of different portions of a scene on a camera imager, the imager being a part of an electronic camera that captures 3-dimensional objects;
    generating a plurality of image data tiles that represent the images using the camera;
    generating a plurality of text data tiles each containing text recognized in a corresponding one of the image data tiles;
    searching for overlapping text in the text tiles;
    wherein at least one of the text tiles contains an error in representing text in the scene, the method further comprising generating a second image data tile of the portion of the scene that includes said text; and then generating a second text data tile based on the second image tile and that does not contain said error and then pasting the second text tile in proper alignment into an electronic file to replace the error.

13. A method according to claim 12 further comprising
    generating an electronic file to which the text data tiles are appended.

14. A method according to claim 13 wherein the generating of the text data tiles is performed by a data processing device separate from the camera.

15. A method according to claim 13 further comprising
    transferring the electronic file to a data processing device separate from the camera using a computer peripheral bus.

16. A method according to claim 12 further comprising generating a graphics figure in response to stitching some of the plurality of image data tiles that contain non-text portions unrecognized by the optical character recognition engine; and appending the graphics figure to the electronic file.

17. A method according to claim 12 further comprising:

changing the size of the text in the second image data tile to be substantially different from the size of the text in the image data tiles.

18. A method according to claim 17 wherein the step of changing the size of the text includes changing a focal length of camera optics without substantially changing the distance between the camera imager and an object in the scene.

19. A method according to claim 17 wherein the changing of the size of the text includes changing the distance between the camera imager and an object in the scene.

20. An electronic camera comprising:

optics to form a plurality of light images of different physical portions of a scene bearing text;

camera imager to receive the light images and in response provide a plurality of image data tiles corresponding to the plurality of light images, respectively;

optical character recognition engine to provide a plurality of text data tiles each containing a portion of said text recognized from a corresponding one of the image data tiles;

text linker to search for an overlapping portion of said text in the text tiles and to append the text data tiles in proper alignment, based on the overlapping portion, to an electronic file; and an error correction routine that when executed corrects error text, in the plurality of image data tiles, by recognizing correct text in another image data tile obtained by the imager and that represents a portion of the scene previously captured using the imager and replaces the error text with the correct text.

21. An article of manufacture comprising:

a machine-readable medium having instructions that, when executed by a processor cause a system to:

receive a plurality of image data tiles that represent a plurality of light images, respectively, of different physical portions of a scene that includes text, captured by an electronic camera having optics with a depth of field greater than that of a conventional scanner;

generate a plurality of text data tiles each containing a portion of said text recognized in a corresponding one of the image data tiles; and search for an overlapping portion of said text in the text tiles and on that basis append the text tiles in proper alignment to an electronic file, and correct an error in the appended text tiles by recognizing correct text in another image tile that represents a portion of the scene previously captured by the camera and replacing the error with the correct text.

22. A method comprising:

forming a plurality of light images of different physical portions of a text bearing scene on a camera imager, the imager being a part of an electronic camera that captures 3-dimensional objects;

generating a plurality of image data tiles that represent the plurality of light images, respectively, using the camera;

generating a plurality of text data tiles each containing a portion of said text recognized in a corresponding one of the image data tiles;

searching for a matching portion of said text in the text tiles and generating an electronic file to which the text tiles are appended based on the matching portion;

determining error text in the plurality of text tiles;

re-capturing, using the electronic camera, a region of the scene that contains correct text, in another image data tile;

generating another text data tile that does not contain the determined error and that does contain the correct text as recognized from said another image data tile; and then pasting said recognized, correct text into the file.

23. The method of claim 22 wherein the determined error text has one of improperly recognized text and a misalignment of text tiles.

24. The method of claim 22 wherein the error is determined by a user comparing the file being built on a display to a document in the scene.

25. The method of claim 24 wherein the error is determined prior to all of the text in the document being processed by the camera.

26. The method of claim 22 wherein the error is determined by a spell checker built into the camera and that can detect misspelled words in the file.

27. The method of claim 22 further comprising:

providing said another text data tile for display to a user of the camera.

* * * * *